(12) United States Patent
Witting et al.

(10) Patent No.: US 6,312,193 B1
(45) Date of Patent: Nov. 6, 2001

(54) COUPLING SYSTEM FOR SUBSEA PIPELINES AND METHOD FOR ESTABLISHING SUCH SYSTEM

(75) Inventors: Fredrik Witting, Asker; Per Olav Halle, Baerums Verk, by Liv Mette Ramstad Halle, legal representative; Odd-Bjarne Klemetsdal, Asker, all of (NO)

(73) Assignee: ABB Offshore Systems AS, Nesbrue (NO)

( * ) Notice: Subject to any disclaimer, the term of this patent is extended or adjusted under 35 U.S.C. 154(b) by 0 days.

(21) Appl. No.: 09/380,642

(22) PCT Filed: Mar. 6, 1998

(86) PCT No.: PCT/NO98/00078

§ 371 Date: Nov. 26, 1999

§ 102(e) Date: Nov. 26, 1999

(87) PCT Pub. No.: WO98/39590

PCT Pub. Date: Sep. 11, 1998

(30) Foreign Application Priority Data

Mar. 7, 1997 (NO) ...................................... 971074

(51) Int. Cl.[7] ...................................................... F16L 1/16
(52) U.S. Cl. ........................... 405/169; 405/154; 405/158
(58) Field of Search ................................ 405/154, 158, 405/166, 167, 169, 174

(56) References Cited

U.S. PATENT DOCUMENTS

| | | | |
|---|---|---|---|
| 4,133,182 | * | 1/1979 | Chateau ................................. 405/169 |
| 4,457,378 | | 7/1984 | Watkins . |
| 4,525,101 | | 6/1985 | Stevens et al. . |
| 4,784,523 | * | 11/1988 | Louis et al. ........................... 405/169 |
| 4,793,737 | | 12/1988 | Shotbolt . |
| 4,842,075 | * | 6/1989 | Kalvenes et al. ..................... 405/169 |
| 5,018,903 | * | 5/1991 | O'Donnell et al. ................... 405/169 |
| 5,033,907 | * | 7/1991 | O'Donnell et al. ................... 405/158 |
| 5,593,249 | * | 1/1997 | Cox et al. ............................. 405/169 |
| 6,004,072 | * | 12/1999 | Cunningham ......................... 405/158 |

* cited by examiner

Primary Examiner—Thomas B. Will
Assistant Examiner—Alexandra K. Pechhold
(74) Attorney, Agent, or Firm—Nixon & Vanderhye P.C.

(57) ABSTRACT

System and method for coupling of a bottom based pipeline to an adjacent riser pipe or another pipeline, of the kind wherein is utilized a bottom based coupling frame. The underside of the frame (2) is designed in order to undergo displaceable movements along the sea bottom or on a fundament thereon both during and subsequent to coupling of the pipelines to the frame. On the frame are mounted coupling members for one importing and one exporting pipeline, and a pipe connection between the pipe couplings, optionally including a valve and other equipment. In accordance with the method, a tool including a winch and a pulling wire, is mounted on the frame whereby the frame, including the pipeline, can be pulled together in order to accomplish the coupling operations.

7 Claims, 2 Drawing Sheets

COUPLING SYSTEM FOR SUBSEA PIPELINES AND METHOD FOR ESTABLISHING SUCH SYSTEM

BACKGROUND OF THE INVENTION

The present invention relates to a system and a means for interconnecting an operation of flow lines, particularly in connection with submerged pipelines and riser conduits. The invention relates further to methods for establishing such systems.

As basis for intercoupling submerged and bottom based pipelines and other conduits or riser pipes are today used so called templates or bottom frames, which among other things can serve as stations for coupling the pipelines together. The templates may be equipped with pipe couplings, various types of valves and other production equipment. In addition the templates serve as a fundament for positioning different types of tools which may be used for pull-in operations and installation of the pipelines.

The bottom based pipelines in such systems have frequently substantial dimensions such as 20–50 centimeters in diameter or more with corresponding high weight and large stiffness. The pipelines may extend several kilometers along the sea bottom. In order to carry out the pull-in and coupling on such pipelines on to an usually already installed template, large and usually heavy powerful tools including winch equipment are required, and which during the operations must be positioned and mounted in stable fashion on the template. Bottom frames of this type assume therefore considerable dimensions, and may with the installed equipment assume weights up to 200 tons or more. The pull-in equipment may likewise frequently assume a weight of 25–35 tons and must provide pulling forces in the range 30–80 tons.

Bottom frames are usually piled to the sea bottom or are provided with skirts in order to sustain horizontal forces, both in connection with the hauling operations and from the thermal loads and stretches arising in the pipelines during the transport of oil and gas.

When the coupling of bottom bases pipelines have been accomplished, and the bottom based transport station is put into operation, large problems may arise in connection with the thermal movements in the pipelines when this is used for transport of oil and/or gas with temperature which may vary from ambient temperature up to for instance 70–80° C. The theoretical elongation in a pipeline of actual type with a length of 1–2 kilometers may be 1–2 meters. In order to distribute movements and forces, the pipeline is usually arranged with curves along the sea bottom such that thermal expansion and contractions may take place laterally, but the final or end part of the pipeline facing the bottom frame must necessarily extend in a straight line towards the pipe coupling. Since the bottom frame is completely restrained from movement, the coupling will be subjected to large stresses due to thermal movements, not only tensional and compression stresses, but to more critical bending stresses. Such bending stresses in the pipeline will increase progressively towards the coupling itself, and will reach a peak point therein. In order to reduce the risk for failure in the coupling, the coupling units must be over-dimensioned relative to the pipe.

The principal object for the present invention is to provide a new system solution to be used in connection with intercoupling of subsea pipelines particularly between subsea production pipelines and riser pipes. A further object of the invention is simultaneously to develop coupling equipment having lower weight, a factor which will provide substantial technical and economical advantages.

With the designation "pipeline" shall herein be understood various types of pipe bundles or mantles encompassing two or more pipes, cables or the like.

The invention is based upon a new concept, namely to arrange the coupling system displaceable on the sea bottom during the hauling and coupling operations as well as later when the system is put into operation. The invention is more particularly characterised in that a bottom frame including pipe couplings, valves and other equipment are being mounted on a relatively light weight sledge-like structure which is adapted for displaceable support on the sea bottom or optionally one on the sea bottom positioned bottom plate, fundament or the like conforming to the character of the sea bottom.

A further important feature of the concept of the invention is that it makes it possible to use relatively light weight hauling- and coupling equipment because instead of pulling the end of the pipeline resting on the sea bottom to the bottom frame, the bottom frame may be pulled to the pipeline, an operation which in most cases will require far less power, and simplify the coupling operation. When the coupling between the pipeline and the displaceable bottom frame is finalised, a riser pipe, flexible or not, may be coupled at the other side or end of the bottom frame. A riser pipe will normally rest on the sea bottom along a certain stretch. This implies that when the system is put into use, all thermal movements in the pipeline will be transferred to the displaceable bottom frame and further to the riser pipe, which however without large problems can move forward and backwards on the sea bottom along the stretch or section resting on the sea bottom.

It is priority known to use belt vehicles and sledge-like structures for towing and transporting pipelines along a sea bottom. As illustrative for the prior art one can refer to U.S. Pat. Nos. 4,457,378, 4,525,101 and 4,793,737.

U.S. Pat. No. 4,525,101 shows a pipeline with the end section mounted on a sledge which can be hauled along the sea bottom by means of hauling equipment mounted on submerged tool which is suspended in a cable down from a sea surface vessel. The pipeline shall be coupled to a second pipeline, which likewise is mounted on a sledge-like stretcher.

U.S. Pat. No. 4,793,737 shows a pipe coupling station mounted on a sledge. A flexible riser pipe is submerged down from a sea surface vessel and coupled to the station, whereafter the unit is pulled to a fixed mounted bottom frame by means of winch equipment mounted on the bottom frame in order to couple the riser pipe to production equipment on the bottom frame.

U.S. Pat. No. 4,457,378 shows a pipe coupling module mounted on a sledge designed to be directly coupled to a bottom based pipeline. The coupling station is coupled to the pipeline, either at the sea surface or at the bottom. In the vicinity of the pipeline is on the sea bottom positioned a bottom frame. Upon this frame is submerged a second module with winch equipment, thereafter the coupling module including the pipeline is winched into the bottom frame and is elevated up from the sea bottom to a position on the bottom frame by means of coupling and winch equipment which is lowered down from a sea surface vessel.

The preceding briefly described technique has in common that the sledge structures are utilised for transporting sledges together with a pipeline in order to pull the before mentioned equipment to a fixed stationary bottom frame by means of winch equipment mounted thereon.

There is further known a coupling solution which in the oil industry frequently is named as "PLEM" (Pipeline End Manifold). The essence of this solution is that a pipe end structure is being welded to a pipeline in position on the sea surface, where after the unit including the pipe is lowered down on to the sea bottom for later coupling to a second pipeline or riser pipe.

SUMMARY OF THE INVENTION

The object of the present invention is to provide a bottom frame structure including pipe couplings to be coupled to an already installed bottom based pipeline, and further a riser pipe, and wherein the bottom frame in the shape of a sledge-like bottom frame by means of temporarily mounted pulling tool can be hauled to the pipeline and coupled to the same, instead of as usual to haul the pipeline to the bottom frame. A further essential feature of the invention is that when the coupling operations have been made to the pipeline on the sea bottom and a riser pipe, respectively the displaceable sledge-like bottom frame is operating as a production frame. Hereby is obtained the substantially advantage that thermal movements in the pipeline will take place with a corresponding displacement in the bottom frame on the sea bottom resulting in reduced stresses, particularly bending stresses on the coupling equipment and the load sustaining parts of the sledge frame.

The concept in accordance with the invention is primarily directed at the coupling and operation of one single ingoing and one single outgoing pipeline, and where one of the pipelines consists of a riser pipe.

The system in accordance with the invention by using a displaceable bottom frame or sledge can normally only be used for one second pipeline in and out, respectively, since if a second pipeline is connected to the frame, this pipeline will be rigidly mounted to the other pipeline having into effect that thermal movements in one first pipeline will migrate in the shape of bending stresses etc. to the other pipeline or possibly to a third pipeline. This fact involves that if several bottom based pipelines shall be coupled to the common bottom station, one must utilise a separate sledge-shaped bottom frame for each separate pipeline. At the station for one or more riser pipes, one can with this system utilise a number of side by side positioned displaceable frames, each of which takes care of one single bottom based pipeline.

The invention involves also a preferred method for utilising the equipment.

An embodiment for coupling equipment in accordance with the invention shall be described with reference to the accompanying drawings.

DESCRIPTION OF THE PREFERRED EMBODIMENTS

Figure 1:
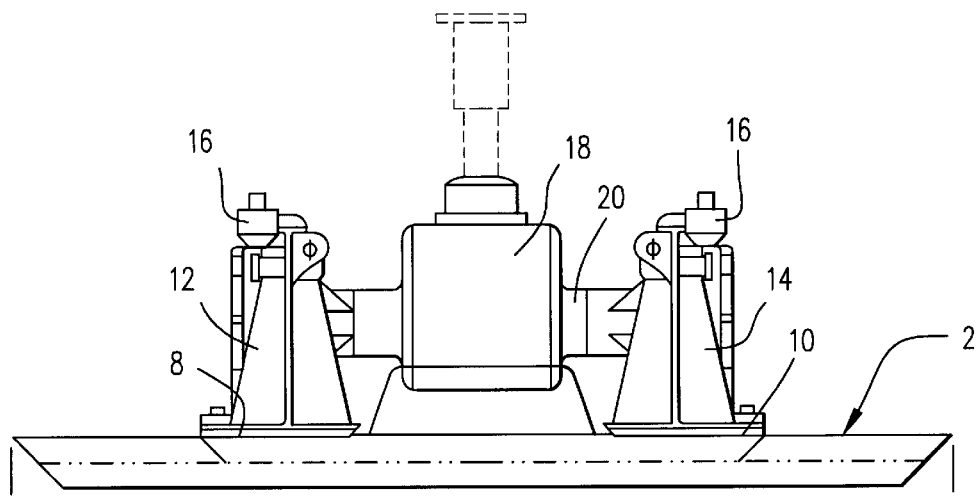
FIGS. 1, 2 and 3 show a side view, a plan view and a front view of a bottom frame construction in accordance with the invention, respectively, with ready mounted coupling and valve equipment.
Figure 2:
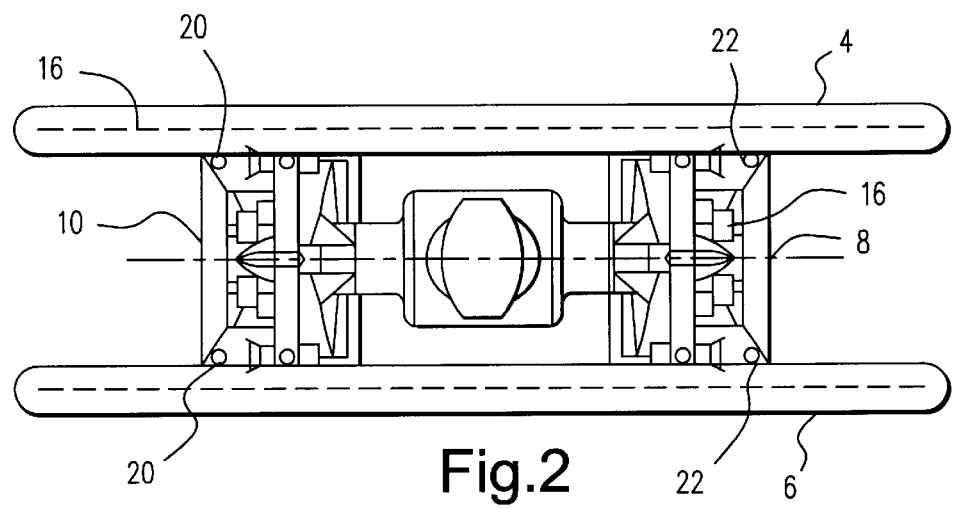
Figure 3:
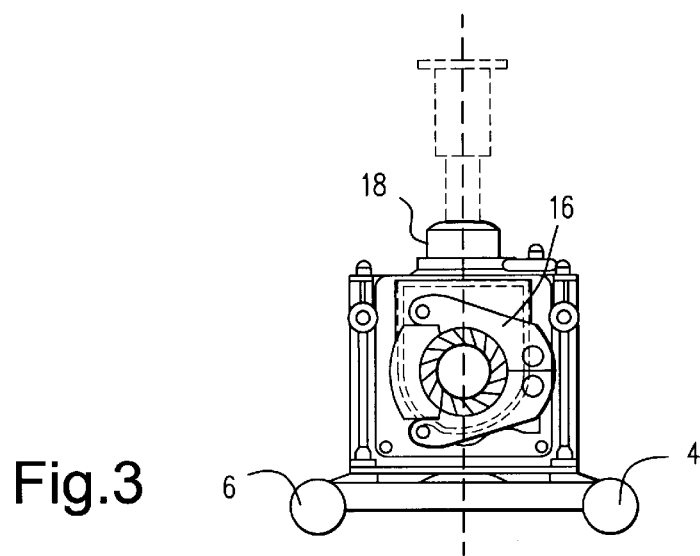

In FIGS. 1, 2 and 3, wherein the same reference numbers designates the same parts, the number 2 generally designates the bottom frame which in the shown embodiment consists of two with suitable mutual spacing positioned pipe structures 4 and 6 which are held together by transverse beams 8 and 10 which simultaneously provide basis for two support columns 12 and 14, on which are mounted two pipe couplings 16, 16 with pipe clamp tools of in per se known art. Between the pipe couplings a pipe section 20 extends wherein is positioned a valve 18. On the support column 12 and 14 are in the vicinity of the pipe couplings 16, 16 provided couplewise landing posts, designated 20, 20 and 22, 22, respectively, for positioning and mounting a pull-in tool for coupling of a pipeline and a riser pipe, respectively.

Figure 4:
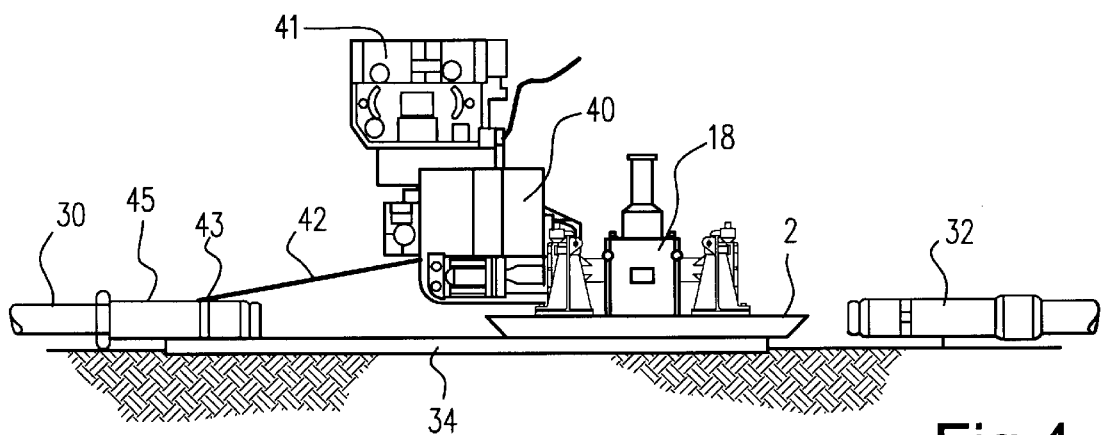
FIGS. 4 and 5 show a side view and a plan view, respectively, of the sledge-shaped bottom frame including a positioned coupling tool in position on a sea bottom in order to initiate the hauling and coupling procedure.
Figure 5:
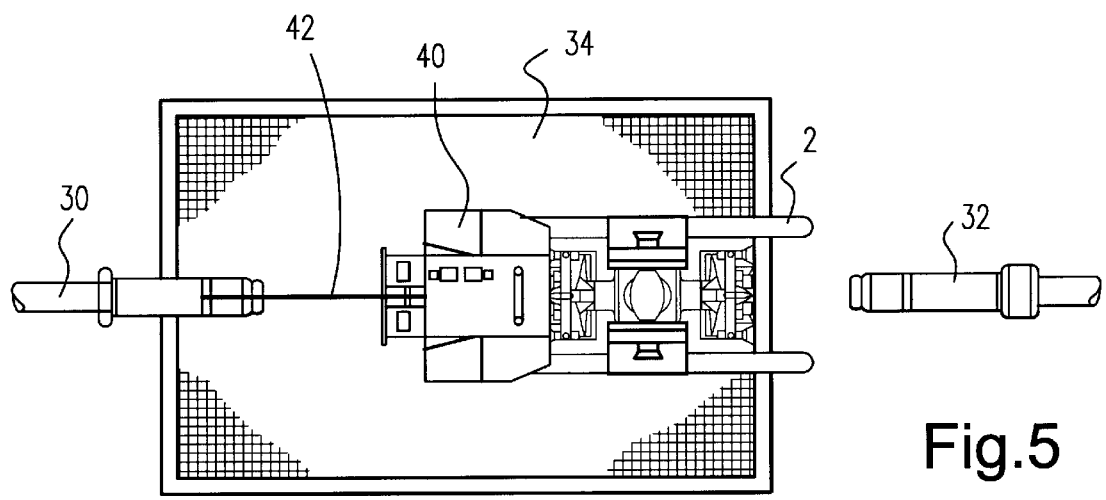

FIGS. 4 and 5 shows a coupling frame in accordance with the invention, lowered down to working position on a sea bottom between an already positioned laid out pipeline 30 and a riser pipe 32. The positioning of the pipeline, riser pipe and a coupling system in accordance with the invention will among others depend upon the nature of the bottom. In some cases it is necessary to prepare, for instance to level, the sea bottom around the coupling vicinity. In other cases it is however desirable to arrange a platform or a fundament for the coupling frame, such that a frame more easily can displace itself along the sea bottom both during the coupling proceeding and later when the system has been put into operation. The intercoupled pipeline system shall transport oil or gas. In some cases it may be suitable to attach to the end section of the pipeline, while the same still is positioned at the sea surface, a suitable mat-like platform 34, which for instance may consist of an interlinked grating of steel or the like.

On the landing posts 20, 20 on the bottom frame is shown a positioned pull-in and coupling tool 40. This tool may suitably be equal to the construction shown in applicant's pending Norwegian Patent Application 970368.

Figure 6:
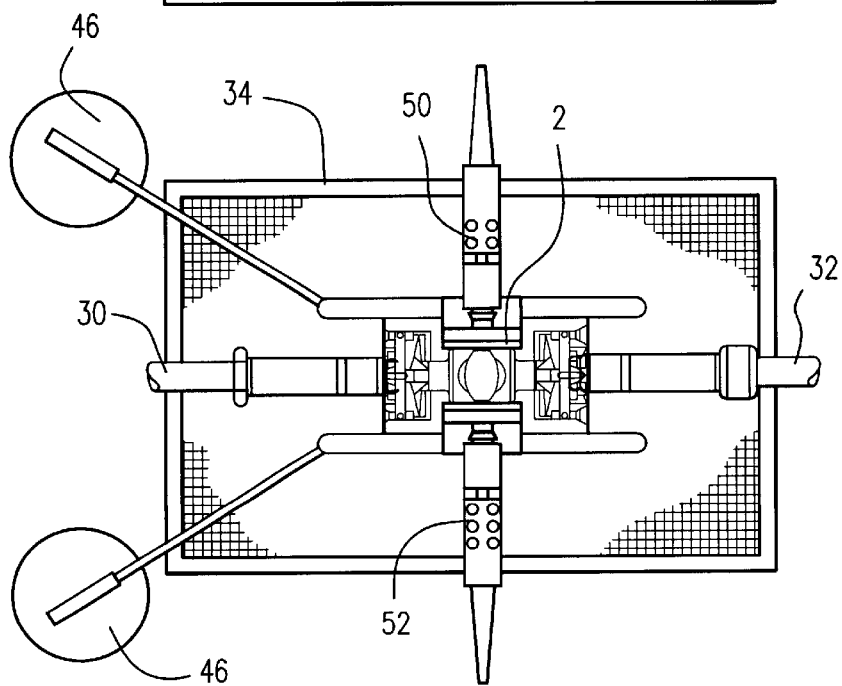
FIG. 6 is a plan view illustrating a finished pipe coupling system in accordance with the invention.

A normal procedure for installing and operating a pipe coupling system in accordance with the invention will be as follows:

Pipelines which shall be installed on a sea bottom in order to be coupled to a riser pipe leading up to a surface vessel, such as a platform, a vessel or a like, or possibly for preliminary or permanent coupling to a flexible pipe leading up to a land station, are usually on beforehand laid down on a sea bottom in the vicinity of the operations, and is thereafter plugged at the end. The pipeline may consist of one separate pipeline, or two or more parallel pipelines or conduits arranged as a bundle positioned in a circumscribing mantle. At the end of the pipeline is usually positioned a so-called termination or mantle conformed to the construction of the hauling tool. In the shown embodiment the end section of the pipeline 30 is provided with a mat-like fundament 34 which in addition to supporting the pipeline on the sea bottom, provides displaceable support for the bottom frame 2. When the same is lowered down and positioned in suitable distance from the pipeline with the pipe couplings substantially flush or on line with the pipeline, as shown in FIG. 5, the coupling tool 40 is lowered down and positioned on the landing posts 20,20. The tool is usually provided with one or more buoyant bodies such that it is more or less weightless in submerged position. By means of a ROV 41 the pull-in wire 42 is being pulled out from the winch, and attached to fastening means 43 on the pipeline or on the mantle on the same. Thereafter the winch is started having into effect that the bottom frame including the equipment thereon is hauled to the pipeline, simultaneously as the pipe jacket or mantle on the pipeline attains a position below the pull-in tool, such that positioning and coupling can be accomplished. If a possible oblique position between the pipe coupling on the bottom frame and the axis of the pipeline, respectively, should occur, such oblique position is usually eliminated during the hauling by the fact that the bottom frame will undertake a pivotal movement on the fundament 34. The finalising pull-in and intercoupling of the pipeline to the pipe coupling on the frame can suitably be accomplished as shown and described in applicant's co-pending Norwegian Patent Application 970368. Thereafter the coupling tool is lifted up and removed by means of a not shown ROV, and is thereafter turned 180° and is lowered down on the landing post 22, 22 whereafter the rising pipe 23 is pulled in to the bottom frame and is coupled to the complementary pipe coupling. While the pull-in and intercoupling of the pipeline to the bottom frame equipment normally will take place in that the bottom frame is hauled to the pipeline, the bottom frame will thereafter normally remain stationary on the sea bottom or support during the pull-in of the riser pipe. In this situation the coupling of the riser pipe and the pipeline to the equipment on the coupling sledge is accomplished. The operational equipment on the bottom frame may optionally include a monitoring and control cables 50, 52 which suitably are connected to the valve equipment on opposite side thereof, are shown in FIG. 6.

When the production aggregate as shown and described is put into operation, the pipe conduits transport a heated production media, for instance oil at temperatures up to 70–80°, a fact which will imply that the pipeline may undergo thermal movements in longitudinal direction on the sea bottom of about 1–2 meters, in addition to that it may pivot somewhat to either side. During such movements the bottom frame will be displaced backwards and forwards, possibly laterally, on the underlying support. The riser pipe will undergo similar movements, but experience shows that such movements in the riser pipe are not critical in as much that it usually is flexible. Larger thermal movements lengthwise will also be caught up by the upwardly directed riser pipe, which normally is being installed in a so called J-form.

In order to limit the movements of the bottom frame on the sea bottom or the support around and prattle coupling system from leaving the prescribed position, the bottom frame is suitably provided with bottom anchors, for instance as shown four so called clump weights 46, 46, 46, 46 arranged crosswise on the sea bottom.

What is claimed is:

1. A method of assembling first and second undersea pipelines, comprising the steps of:

lowering a transportable frame carrying first and second spaced coupling stations between spaced ends of the first and second undersea pipelines, said frame including a communicating pipeline between said coupling stations;

securing a pulling assembly between the end of said first pipeline and the coupling frame;

pulling the coupling frame toward the end of said first pipeline, while the end of the first pipeline remains substantially stationary, by operating the pulling assembly thereby locating said first coupling station in position for coupling with the end of the first pipeline;

coupling the first coupling station and the end of the first pipeline to one another;

securing the pulling assembly between the end of said second pipeline and the coupling frame;

pulling the second pipeline end toward said second coupling station on said frame, while said frame remains substantially stationary, by operating the pulling assembly, thereby locating the end of said second pipeline in position for coupling with said second coupling station; and coupling the second coupling station and the end of said second pipeline to one another whereby said first and second pipelines are coupled to one another for communication therebetween through said communicating pipeline.

2. A method according to claim 1, including removing the pulling assembly from said frame after said first and second pipelines are coupled to one another for communication therebetween through said communicating pipeline.

3. A method according to claim 2, including flowing petroleum products through said pipelines and displacing the frame along the undersea bottom in response to displacement of said first and second pipelines caused by temperature variations of the petroleum product flowing through the pipelines.

4. A method according to claim 1 including, prior to lowering the frame, lowering a flexible mat for support on the undersea bottom and thereafter lowering the frame onto said mat.

5. A method according to claim 4 including flowing petroleum products through said pipelines and displacing the frame along the mat in response to displacement of said first and second pipelines caused by temperature variations of the petroleum products flowing through the pipeline.

6. A method according to claim 1 wherein the pulling assembly includes a winch carried by said frame and a pulling line connecting between the winch and the end of said first pipeline, and operating the winch to pull the line to draw the frame toward the end of said first pipeline.

7. A method according to claim 1 including a coupling tool, lowering the coupling tool onto the undersea frame, and employing said coupling tool to couple the first and second pipelines and the respective coupling stations to one another.

* * * * *